United States Patent [19]

Eklund et al.

[11] Patent Number: 4,567,255

[45] Date of Patent: Jan. 28, 1986

[54] METHOD OF PRODUCING CELLULOSE CARBAMATE

[75] Inventors: Vidar Eklund; Kurt Ekman; Olli Turunen; Jouko Huttunen, all of Porvoo; Johan-Fredrik Selin, Helsinki; Jan Fors, Porvoo, all of Finland

[73] Assignee: Neste Oy, Finland

[21] Appl. No.: 710,689

[22] Filed: Mar. 12, 1985

[30] Foreign Application Priority Data

Mar. 12, 1984 [FI] Finland ................................. 840999

[51] Int. Cl.$^4$ ............................................. C08B 15/06
[52] U.S. Cl. ..................................................... 536/30
[58] Field of Search .......................................... 536/30

[56] References Cited

U.S. PATENT DOCUMENTS 4,404,369  9/1983  Huttunen et al. ...................... 536/30
4,456,749  6/1984  Mandell et al. ....................... 536/30
4,486,585 12/1984  Turunen et al. ....................... 536/30
4,526,620  7/1985  Selin et al. ............................ 536/30
4,530,999  7/1985  Selin et al. ............................ 536/30

Primary Examiner—Ronald W. Griffin
Attorney, Agent, or Firm—Steinberg & Raskin

[57] ABSTRACT

The invention is directed to a procedure for manufacturing cellulose carbamate by reacting isocyanic acid and cellulose at elevated temperature. In the procedure, cellulose, to which biuret or a mixture of biuret and urea has been admixed or absorbed, is heated at a temperature over 170° C. for a sufficient time to produce a quantity of isocyanic acid sufficient for formation of the cellulose carbamate and for accomplishing the reaction between cellulose and isocyanic acid. The heating is accomplished at 170°–250° C., preferably at about 220° C. The biuret quantity is 3–50% by weight of the cellulose weight and the urea quantity is 0–95% by weight of the cellulose weight.

14 Claims, No Drawings

METHOD OF PRODUCING CELLULOSE CARBAMATE

BACKGROUND OF THE INVENTION

The present invention relates to a procedure for manufacturing cellulose carbamate by reacting isocyanic acid and cellulose at elevated temperature.

Both Finnish Pat. Nos. 61033 and 62318 disclose a procedure for manufacturing an alkali-soluble cellulose derivative from cellulose and urea. The procedure is based on the fact that when urea is heated to its melting point or to a higher temperature it begins to decompose to isocyanic acid and ammonia. The isocyanic acid reacts with cellulose, producing an alkali-soluble cellulose derivative, called cellulose carbamate. The reaction may be written as follows:

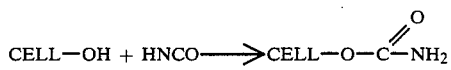

The cellulose compound thus produced, namely cellulose carbamate, may be dried after washing and stored even for prolonged periods, or it may be dissolved, for instance for fiber production, in an aqueous alkali solution. Cellulose carbamate fibers or films may be manufactured from such solution by spinning or by extruding, in the same manner as in the viscose manufacturing process. The stability of cellulose carbamate and the feasibility of its transport in dry state afford a great advantage compared with cellulose xanthate in the viscose method, since the latter cannot be stored or transported, neither in dry nor in solution form.

When urea decomposes under the effect of heat to isocyanic acid and ammonia, certain additional side reactions occur. One such side reaction is the reaction of isocyanic acid with urea, whereby biuret is produced. This biuret is still present, after the carbamate reaction, in the carbamate that has been produced and has to be removed, e.g. by washing. Moreover, it is necessary to remove, from the carbamate, the urea that has not reacted or has not been decomposed, the amount of which may be considerable at the start.

Efforts are naturally made in any industrial process to recover chamicals that are required in the reaction and to recycle the same for reuse in the process. In a continuous carbamate process, this involved separation of urea from the cellulose carbamate and, furthermore, separation from urea of the biuret produced as a by-product. The removal step increases the costs of the process.

SUMMARY OF THE INVENTION

It is accordingly an object of the present invention to provide a new and improved method for manufacturing cellulose carbamate.

It is also an object of the present invention to eliminate the above-noted drawbacks of the prior art.

It is an additional object of the present invention to provide for the production of cellulose carbamate in a more economical manner.

It is a further object of the present invention to avoid the need for further separating reactants after separation from produced cellulose carbamate, to recycle the same.

With these and other objects in view, the present invention is directed to a new method for manufacturing cellulose carbamate by reacting isocyanic acid and cellulose at elevated temperature, wherein cellulose with biuret, or a mixture of biuret and urea, admixed thereto or absorbed therein, is heated at a temperature over 170° C. for suitable time to produce sufficient iscyanic acid for accomplishing the reaction between cellulose and isocyanic acid, thus forming the cellulose carbamate.

The invention is based on the concept that, in manufacturing cellulose carbamate, urea is in fact not indispensable, and biuret may be used instead. Biuret, which is an additional product of urea and isocyanic acid, is decomposed to urea and isocyanic acid again at temperatures over 170° C. Urea decomposes further to isocyanic acid and ammonia. Thus it is possible to use, instead of urea, biuret or a mixture of biuret and urea if temperatures are used which are so high that decomposition of urea will begin.

By using biuret, a very flexible process is attained. Since, in manufacturing cellulose carbamate, biuret is produced as an additional product of isocyanic acid and urea, in accordance with the present invention, biuret may be appropriately used as a reagent to be added to the cellulose and may be properly recycled straight to the beginning of the method, for processing a new batch of cellulose.

DETAILED DESCRIPTION OF THE PREFERRED EMBODIMENTS

It is possible to use either biuret alone or a mixture of biuret and urea. The nitrogen consumed in the process (the part consumed in forming the carbamate) may be made up either by adding urea or by adding biuret.

A working temperature range in the procedure of the present invention is from about 170° to 250° C., the temperature most preferably being about 220° C. Temperatures over 250° C. should be avoided, because the risk of side reactions then increases.

The required biuret quantity in the procedure of the invention is 3–50% by weight of the cellulose quantity. When smaller biuret quantities are used, the amount of isocyanic acid produced on heating may be too low, while using greater amounts of biuret is neither economical nor even necessary in view of the reaction.

In addition to biuret, it is also possible to use urea, if desired. The amount of urea in the procedure of the invention may be from 0 to 95% by weight of the weight of cellulose and biuret.

In manufacturing cellulose carbamate according to the procedure of the invention, the biuret or mixture of biuret and urea may be composed of biuret or a mixture of biuret and urea that did not react and was washed out of the product after the carbamate reaction. It should be noted that the product contains marked amounts of biuret and urea, after the carbamate reaction.

The biuret may be added to the cellulose as raw material, for instance in an appropriate solvent. A suitable solvent in association with biuret and urea is ammonia, which is preferably, though not necessarily, in liquid form. In that case, either a low temperature is used or dissolving is accomplished under pressure. The requisite quantity of biuret, or mixture of biuret and urea, is dissolved in ammonia, and the cellulose is impregnated with the solution, whereafter the ammonia is removed for instance by evaporating. The cellulose may be in the form of loose chains or of a web. The required absorbing time varies, usually from a few seconds to several hours and it is not critical, provided that sufficient biuret is applied to the cellulose fibers. The cellulose may be conducted through the ammonia treatment, for instance, by being carried on wires.

The cellulose used in manufacturing carbamate may be pretreated for lowering the degree of polymerization. Adjustment of the degree of polymerization may be effected, e.g. by alkali treatment or by irradiation.

The heating of the cellulose and the biuret is carried out, for instance, in a volume like a heat chamber, or by conducting a cellulose web or mat containing biuret through a liquid bath at the required temperature. Cellulose in the form of the web may be conducted, supported by wires or the equivalent. If a liquid is used, a liquid is chosen which does not dissolve biuret or urea. The lower the temperature at which the liquid boils, the easier is its removal on concluding the reaction, for instance by evaporating. Suitable liquids, are, for instance, aromatic or aliphatic hydrocarbons with comparatively low boiling points.

After the reaction, the end product is washed once or several times, for instance with water-free methanol, and dried. The end product is also preferably washed with liquid ammonia, whereby an advantage is gained in that the ammonia mixture containing biuret and urea, used as washing liquid, can be directly reused.

The cellulose used as starting material in the procedure of the invention may be wood cellulose or cotton, or other natural or synthetic fibers containing cellulose. The cellulose may be present as such or in a chemically treated form, for instance bleached, as cellulose hydrate, as alkali cellulose, or in a form treated in another way, for instance with acids.

The invention is described more in detail in the following examples. The scope of the invention is not, however, meant to be limited to the specific details of the example.

EXAMPLE 1

Bleached spruce sulphite cellulose in sheet form (700 g/m$^2$), was treated with the aid of irradiation in order to adjust its DP (degree of polymerization) to be 420. The irradiation was carried out as electron irradiation (400 keV). Thereafter, the sheets were impregnated for five minutes at −35° C. with liquid ammonia in which 5% biuret had been dissolved. The ammonia was allowed to evaporate at room temperature for a few hours, whereby the quantity of biuret left in the cellulose was 13% by weight of the cellulose weight.

Biuret-impregnated sheets were heated, by pressing between hot plates at 220° C. and at 240° C. The heating time was 5 min. at the lower temperature and 2 min. at the higher temperature. The sheets were washed three times with water and once with methanol. The carbamate was established by spectroanalytical (IR, $^{13}$C NMR) and chemical methods. A solution was prepared of the sheets in a 10% NaOH solution at −5° C. so that the carbamate content of the solution was 5.7% by weight. From the solution, the clogging number and the viscosity were measured. The results are set forth in Table I below:

TABLE I

| Time | Temperature °C. | DP | N content, % | Clogging number | Viscosity, s | Celluose Content, % |
|---|---|---|---|---|---|---|
| 5 | 220 | 290 | 1.3 | 3525 | 25 | 5.7 |
| 2 | 240 | 341 | 1.3 | 6060 | 70 | 5.7 |

EXAMPLE 2

Example 1 was repeated with the impregnating solution containing 10% biuret, whereby 22% by weight biuret was retained in the cellulose after removing the ammonia. The results are set forth in Table II.

TABLE II

| Time | Temperature, °C. | DP | N content, % | Clogging number | Viscosity, s | Celluose Content, % |
|---|---|---|---|---|---|---|
| 1 | 220 | 406 | 1.3 | 80,000 | 55 | 4.8 |
| 2 | 220 | 357 | 1.4 | 950 | 83 | 6 |
| 3 | 220 | 320 | 1.6 | 800 | 70 | 6 |
| 4 | 220 | 316 | 1.7 | 3,700 | 83 | 6 |
| 5 | 220 | 300 | 1.8 | 800 | 51 | 6 |
| 1 | 240 | 413 | 1.6 | 6,900 | 77 | 5.4 |
| 2 | 240 | 348 | 1.8 | 13,000 | 82 | 5.5 |

EXAMPLE 3

Sheets (20×20 cm) made of bleached spruce sulphite cellulose (DP 400) were impregnated in liquid ammonia as in Example 1. The ammonia contained 6% biuret and 4% urea. The ammonia was allowed to evaporate at room temperature, whereafter the sheets contained biuret and urea totalling 22%.

Thereafter, the sheets were heated between hot plates at 230° C. for 1.5 minutes. The sheets were then washed with liquid ammonia.

When the sheets were dissolved in the 10% NaOH solution to 6% concentration, the clogging number of the solution was found by measurement to be 1500 and the viscosity, 120 s. The nitrogen content of the carbamate was 1.5%.

The preceding description of the present invention is merely exemplary, and is not intended to limit the scope thereof in any way.

What is claimed is:

1. In the method for the manufacture of cellulose carbamate by the reaction of isocyanic acid with cellulose at elevated temperatures, the improvement which comprising heating at a temperature of at least 170° C. cellulose in contact with biuret in an amount sufficient to produce isocyanic acid in an adequate amount to react with cellulose to form cellulose carbamate, said heating being continued until said adequate amount of isocyanic acid is formed.

2. The method of claim 1, wherein the cellulose is admixed with said biuret.

3. The method of claim 1, wherein said cellulose is impregnated with said biuret.

4. The method of claim 1, wherein said heating is effected at a temperature of about 170°–250° C.

5. The method of claim 1, wherein the amount of biuret is about 3–50% by weight of the weight of the cellulose.

6. The method of claim 1, wherein the biuret for reaction with the cellulose is obtained from the reaction for the formation of cellulose carbamate.

7. The method of claim 1, wherein the biuret is contacted with the cellulose in the form of an ammonia solution of said biuret, and wherein the ammonia is removed prior to the reaction with the cellulose.

8. The method of claim 1, wherein said cellulose is heated in contact with biuret and urea.

9. The method of claim 8, wherein said cellulose is admixed with biuret and urea.

10. The method of claim 8, wherein said cellulose is impregnated with said biuret and urea.

11. The method of claim 10, wherein said temperature is about 220° C.

12. The method of claim 8, wherein the amount of biuret is between about 3-50% by weight of the cellulose and the amount of urea is up to about 95% by weight of the weight of the cellulose.

13. The method of claim 8, wherein the biuret and urea for reaction with the cellulose are obtained from the reaction for the formation of cellulose carbamate.

14. The method of claim 8, wherein the biuret and urea are contacted with the cellulose in the form of an ammonia solution of said biuret and urea, and wherein the ammonia is removed prior to the reaction with the cellulose.

* * * * *